April 1, 1941.     G. E. ARMINGTON     2,237,128
POWER WIND FOR DUMP VEHICLES
Filed April 24, 1940
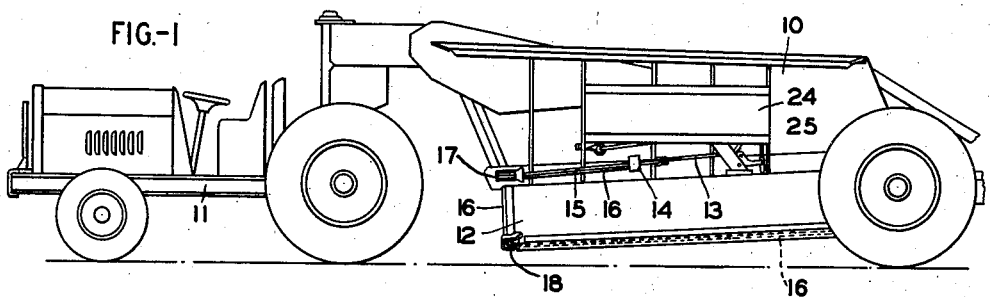
FIG.-1
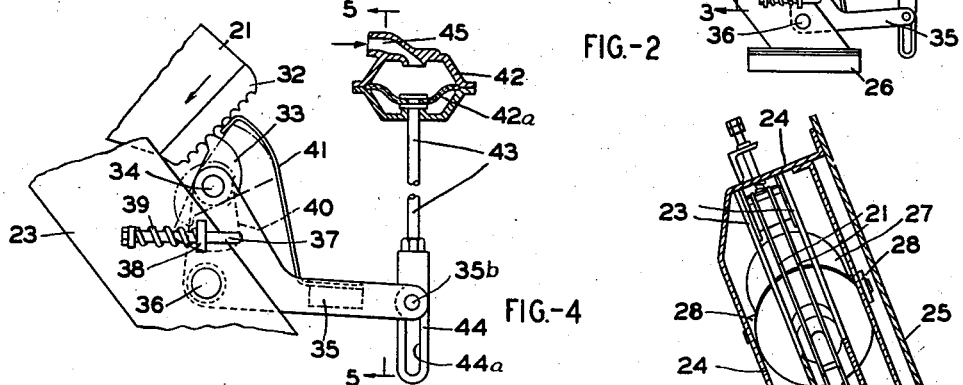
FIG.-2
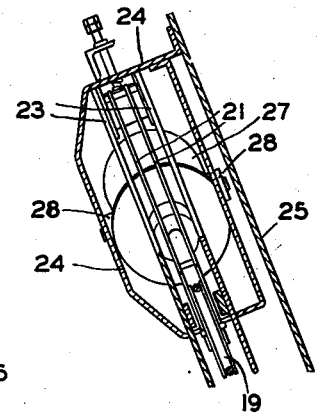
FIG.-3
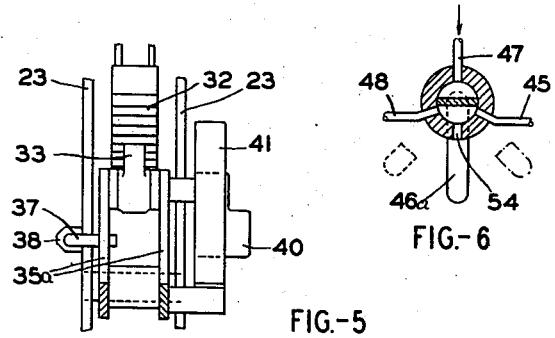
FIG.-4
FIG.-5
FIG.-6
INVENTOR
GEORGE E. ARMINGTON
BY
Hyde and Meyer
ATTORNEYS Patented Apr. 1, 1941

2,237,128

UNITED STATES PATENT OFFICE 2,237,128

POWER WIND FOR DUMP VEHICLES

George E. Armington, South Euclid, Ohio, assignor to The Euclid Road Machinery Company, Euclid, Ohio, a corporation of Ohio Application April 24, 1940, Serial No. 331,287

3 Claims. (Cl. 298—35)

This invention relates to improvements in a door wind for a vehicle having dumping doors, and more particularly to a vehicle wherein the doors move by gravity to open position and require power to close them.

An object of the present invention is to provide a simple mechanism for the purpose comprising a few parts cheap to construct and simple to operate.

Another object of the invention is to provide a simple mechanism movable to door closing position by a fluid motor whereupon the doors are held in closed position by detent means permitting the fluid motor to be evacuated. Another object of the present invention is to provide novel detent means for holding the doors in closed position and novel means for releasing the detent means when the doors are opened.

Other advantages of the invention will appear from the accompanying description and drawing and the essential features thereof will be set forth in the claims.

In the drawing, Fig. 1 is a side elevation of a trailer dump wagon equipped with my improved door closing mechanism; Fig. 2 is an enlarged elevational view of the door closing mechanism generally with the enclosing cover of Fig. 1 removed; Fig. 3 is a transverse sectional view taken along the line 3—3 of Fig. 2; Fig. 4 is an enlarged fragmental detail view of a portion of the mechanism of Fig. 2; Fig. 5 is substantially an end elevational view taken approximately from the position 5—5 of Fig. 4; while Fig. 6 is a diagrammatic view of a control valve.

While my invention is useful on various types of vehicles having various types of dumping doors, I have chosen to illustrate the same as applied to a trailer dump wagon 10 which is drawn by a tractor 11, the dump wagon having a pair of doors 12 each hinged to the bottom edge of a longitudinal side wall of the vehicle and extending to the center line of the bottom when closed so that the two doors together completely close the bottom of the vehicle and drop by gravity about their hinges to the open position shown in Fig. 1. These doors are of the type shown and described in Patent No. 2,055,919 granted September 29, 1936 to Arthur P. Armington and myself and further description is thought unnecessary here.

Means for controlling the position of the doors 12 is provided by means of a cable 13 which is connected by a clamp 14 to two cables 15 and 16. These cables pass about a double sheave 17 at the front lower right-hand corner of the wagon body and thence over separate sheaves located centrally of the front lower end of the body and thereafter cable 16 passes downwardly to the lower front edge of the right-hand door where it passes about a sheave 18, thence along the bottom of the right-hand door to the rear corner thereof where it passes about another sheave and is then attached to a dead man at the rear end of the wagon body. Cable 15 is connected in a like manner to the left-hand door and extends along the lower edge thereof to the rear of the wagon body where it in turn is connected to a dead man. This arrangement of the door closing cables is not new and is in all respects similar to that disclosed in the above mentioned Armington patent.

The present invention is directed to means for pulling on the cable 13 so as to close the doors when they are in open position. To this end the cable 13 has formed in it a bight 13a which passes around a sheave 19 and thence to a dead man 20 rigidly secured to the vehicle body and preferably provided with adjusting means so that the length of the cable may be varied. Referring to Figs. 2 and 3, lever means is provided for swinging the sheave 19 so as to exert a pull on the cable 13. The lever comprises a pair of parallel plates 21 somewhat triangular in form and supporting the sheave 19 rotatably between them. The pivotal mounting for the lever 21 as indicated at 22 comprises a pivot pin passing through the lever and supported by a pair of parallel plates 23. These in turn are secured at their upper end to a housing 24 rigid with the side wall 25 of the vehicle and at their lower end are supported by a bracket 26 on the vehicle body.

Power means is provided for swinging the lever 21 between its full line and dash-dot position indicated in Fig. 2. The means here shown comprises a cylinder and piston motor having a cylinder 27 pivotally mounted on trunnions 28 which in turn are carried by side walls of the housing 24. The piston 29 of the motor is connected by piston rod 30 with the lever 21 by a pivotal connection 31. It will be noted that the lever arm 22, 31 of the power means is approximately half of the lever arm from 22 to the center of sheave 19 so that the motion of the piston rod is approximately half that of the sheave 19. Because the sheave 19 works in a bight of the cable 13 necessarily the pull on the cable 13 is twice the movement of the center of the sheave 19. The dot-dash position of lever 21 in Fig. 2 corresponds to open position of the doors and the full line position of lever 21 corresponds to the fully closed position of the doors.

Means is provided for holding the lever 21 in door closing position against the tendency of the doors to open both because of the action of gravity on the doors themselves and because of the weight of any load carried in the wagon body. To this end a ratchet 32 is secured to the outer end of lever 21, the ratchet teeth being formed substantially upon an arc about the pivot point 22. A pawl 33 is mounted to engage and hold one of the ratchet teeth when the doors are closed. This pawl is pivotally mounted at 34 on an arm 35 which is pivotally mounted on a fixed pivot 36. The arm 35 is in the form of a bell crank lever composed of a pair of side plates 35a between which pawl 33 is mounted. An L-shaped pin 37 connected with a plate 35a as shown in Fig. 5 passes through an opening in bracket 38 mounted on one of the plates 23. Between a nut on the end of pin 37 and bracket 38 is a compression spring 39 which tends to return the arm 35 in a counterclockwise direction to the position of Fig. 2 whenever the arm is moved away from that position in a clockwise direction. A counterweight 40 rigid with the pawl 33 tends to urge the nose of the pawl into engagement with the ratchet 32. In Fig. 2 the pawl 33 is shown in its holding position and it will be noted that the pawl pivot 34 is slightly to the left of a straight line connecting arm pivot 36 with the nose of pawl 33. Thus the tendency of arm 21 and ratchet 32 to move toward the left or in a clockwise direction from the full line position of Fig. 2 tends to cause a counterclockwise movement of arm 35. This tendency is resisted by the servomotor 42 as will presently appear.

Means is provided for moving pawl 33 from its holding position of Fig. 2 to a release position as disclosed in Fig. 4. Preferably power means is utilized for this purpose and the servomotor 42 which has a fluid actuated diaphragm is a convenient means to this end. As indicated in section in Fig. 4, the servomotor has a diaphragm 42a which is connected by rod 43 to a slotted end 44 which lies between the plates 35a of the arm 35. The pin 35b of the arm moves in the slot 44a. Obviously when the parts are in the position of Fig. 2, counterclockwise movement of arm 35 is prevented because the rod 43 presses against the top wall of the housing of servomotor 42. When fluid under pressure is supplied at the inlet 45 of the servomotor 42, the rod 43 makes a downward stroke, causing clockwise movement of the arm 35. Only sufficient movement is necessary to change the position of the pawl pivot 34 from that shown in Fig. 2 to that shown in Fig. 4. In other words in Fig. 4 the pawl pivot is to the right of a straight line connecting the arm pivot 36 with the nose of the pawl 33. The tendency of lever 21 to move in its return direction due to the action of gravity and the load of the vehicle on the doors is indicated by the arrow on lever 21 in Fig. 4. With the pawl pivot in the position there shown this tendency of lever 21 to move in a clockwise direction causes a counterclockwise movement of pawl 33 from the full line position of Fig. 4 to the dot-dash position there shown. In other words the pawl 33 and the substantially vertical bell crank arm of the member 35 form a toggle in the position of Fig. 2 which is there in a locked position holding the lever 21. The action illustrated in Fig. 4 is a breaking of this toggle toward the right. As the counterweight 40 swings in a counterclockwise direction to the dot-dash position of Fig. 4, the guard 41 prevents swinging of the counterweight too far in the counterclockwise direction. It will be noted in the full line position of the parts in Figs. 2 and 4, that the counterweight normally urges the pawl 33 against the teeth of the ratchet 32.

In Fig. 6 is shown diagrammatically a control valve which preferably is located at some point where it may be reached by the operator of the tractor 11. Fluid under pressure is admitted to the valve at 47. The valve is of the usual two-way type adapted to connect the fluid inlet with the outlet 45 leading to the servomotor 42 or to the outlet 48 which leads to the cylinder 27. Spring means is provided for normally returning the valve handle to the full line position of Fig. 6. A port 54 normally evacuates cylinder 27 and servomotor 42.

It is thought the operation of my improved door wind mechanism will now be apparent. When the doors 12 are in their dropped or open position and it is desired to close them, the operator moves the valve handle 46a to its dot-dash position of Fig. 6 so that the valve connects the conduits 47 and 48. This admits fluid under pressure to the left end of cylinder 27 as viewed in Fig. 2 and causes a stroke of the piston rod 30 toward the right. This moves the lever 21 from the dot-dash position of Fig. 2 to the full line position thereof, carrying the sheave 19 toward the right and exerting a pull on the cable 13 until the doors 12 are closed. The pawl 33 then engages one of the teeth of ratchet 32, there being a plurality of such teeth to allow for stretching of the cable or pieces blocking the full closing of the doors 12. When the pawl 33 holds the lever 21, the operator may release the valve handle 46a and the valve will return to its full line position of Fig. 6 under the influence of its centering spring. To drop the doors the operator moves the handle 46a to its dotted line position of Fig. 6 so that the valve passageway connects conduits 47 and 45. This sends a shot of air to the servomotor 42 causing a release stroke of the arm 35. The lever 21 then moves in a clockwise direction due to the action of gravity on the doors 12. This causes a stroke of piston 29 toward the left as viewed in Fig. 2. Air is then sucked in to the right end of cylinder 27 through conduit 49 and air filter 50. The air filter 50 is of the oil bath type and a certain amount of oil is carried from the filter through conduit 49 into the right-hand end of cylinder 27, thus aiding in its lubrication. A check valve 51 permits flow toward conduit 49 only during movement of piston 29 toward the left. A check valve 52 permits fluid flow away from conduit 49 only during a stroke of piston 29 toward the right.

During a door dumping operation the downward movement of doors 12 and the clockwise movement of lever 21 may carry the pivot point 31 above the line A connecting points 28 and 22. A bolt 53 mounted on the vehicle frame and spring pressed downwardly engages lever 21 at such times and causes return of the parts to the dot-dash position of Fig. 2 where the pivot 31 lies adjacent but below the line A. This takes up the slack in the door cables and places the parts in position for the next door closing operation wherein the cylinder and piston motor 27, 29, 30 acts with the least amount of power during the early part of the counterclockwise movement of lever 21 about its pivot 22 as the doors start to close. However as the parts reach the full line position of Fig. 2 where the doors are nearly closed and where most power is required, it will be noted that the piston rod 30 is substantially at right angles to the lever arm between the point 31 and the pivot 22.

What I claim is:

1. In a vehicle having a dumping door, a lever having a pivotal mounting, a door closing cable connected with said door and with said lever, a cylinder and piston motor for moving said lever to pull on said cable to close said door, said cylinder having a pivotal mounting, said piston having a piston rod connected with said lever, and said pivotal mountings and said piston rod connection being so positioned that said piston rod lies to one side of and adjacent a straight line between said pivotal mountings when said door is open and said piston rod lies substantially at right angles to a straight line between said piston rod connection and said lever pivotal mounting when said door is closed.

2. In a vehicle having a dumping door normally tending to open by gravity, a cable for closing said door, a lever having a connection with said cable, means for moving said lever in one direction to close said door against the tendency of gravity acting on said door to return said lever in the opposite direction, a pivoted arm, a pawl pivoted on said arm, a tooth on said lever engaged by said pawl when said lever is in door-closing position, the parts being so positioned and proportioned that when said door is held closed said pawl pivot lies on the lever-return side of a straight line between said arm pivot and the point where said pawl engages said tooth, and means for moving said arm sufficiently to move said pawl pivot to the other side of said straight line, whereupon the tendency of said lever to return rotates said pawl about its pivot and permits dumping.

3. The combination of claim 2, wherein said last named means comprises a servomotor for moving said arm in dumping direction, and said servomotor holds said pawl pivot against movement away from said straight line when said door is held closed.

GEORGE E. ARMINGTON.